(12) United States Patent
Hunter et al.

(10) Patent No.: US 11,345,222 B2
(45) Date of Patent: May 31, 2022

(54) INTEGRATED TOP RAIL TENSION ROLLER SYSTEM

(71) Applicant: Roll Rite LLC, Gladwin, MI (US)

(72) Inventors: Stephen Hunter, Midland, MI (US); Shane Hines, West Branch, MI (US)

(73) Assignee: Roll Rite, LLC, Gladwin, MI (US)

( * ) Notice: Subject to any disclaimer, the term of this patent is extended or adjusted under 35 U.S.C. 154(b) by 6 days.

(21) Appl. No.: 15/733,448

(22) PCT Filed: Jan. 31, 2019

(86) PCT No.: PCT/US2019/016030
§ 371 (c)(1),
(2) Date: Jul. 31, 2020

(87) PCT Pub. No.: WO2019/152637
PCT Pub. Date: Aug. 8, 2019

(65) Prior Publication Data
US 2021/0101457 A1 Apr. 8, 2021

Related U.S. Application Data

(60) Provisional application No. 62/624,410, filed on Jan. 31, 2018.

(51) Int. Cl.
*B60J 7/08* (2006.01)
(52) U.S. Cl.
CPC ..................... *B60J 7/085* (2013.01)
(58) Field of Classification Search
CPC ........................................................ B60J 7/085
USPC ......................................................... 296/98
See application file for complete search history.

(56) References Cited

U.S. PATENT DOCUMENTS

| 5,765,901 A | 6/1998 | Wilkens | |
|---|---|---|---|
| 6,513,856 B1 | 2/2003 | Swanson | |
| 8,226,150 B1 * | 7/2012 | Schmeichel | B60P 7/04 296/98 |
| 8,496,283 B1 | 7/2013 | Schmeichel et al. | |
| 2008/0042466 A1 * | 2/2008 | Searfoss | B60J 7/085 296/100.01 |
| 2013/0249236 A1 * | 9/2013 | Smith | B60J 7/085 296/98 |
| 2021/0188062 A1 * | 6/2021 | Boutin | B60J 7/085 |

FOREIGN PATENT DOCUMENTS

CA 1276209 11/1990

* cited by examiner

*Primary Examiner* — Jason S Morrow
(74) *Attorney, Agent, or Firm* — Miller Canfield (57) ABSTRACT

An apparatus for extending and retracting a cover over a bed of a vehicle transporting material therein. The apparatus comprises an arm assembly, a motor and a tarp reel for rolling and unrolling a tarp to uncover and cover the vehicle bed. To improve tarp tensioning, rollers are provided on a bracket in which the reel seats when the tarp is unrolled. Locations of sliding friction found in known designs are avoided and replaced with rolling friction. Rolling friction is significantly less than sliding friction and thus greater levels of motor output torque can be incorporated into stretching the tarp tighter before the motor is shut off. At this point of the covering operation, the vehicle bed is covered and the tarp held taut. The bracket may also be configured to provide a braking effect to the reel to assist in holding the tarp in tension.

17 Claims, 8 Drawing Sheets

INTEGRATED TOP RAIL TENSION ROLLER SYSTEM

FIELD OF THE INVENTION

The invention relates to vehicle cover or tarp system, and more particularly, to a tension roller system integrated into a vehicle top rail such as the top rail of a vehicle bed of a truck or trailer.

BACKGROUND OF THE INVENTION

Many trucks, particularly those hauling loose loads, such as sand and gravel, in a truck bed or a bed of a trailer need a vehicle cover to prevent the wind from blowing load particles off the load bed. Various apparatus have been devised for covering a truck load. Some such apparatus include a motor for selectively winding a flexible cover. An effective truck cover should be one which is easily operated by the truck driver so as to selectively cover and uncover the truck bed from the convenient location of the truck cab.

As one example, U.S. Pat. No. 5,031,955 provides a truck cover having a motor which may be conveniently operated from the cab of a truck to extend the cover from a winding assembly proximate the front of the truck bed and toward the rear of the truck bed. This '955 patent is hereby incorporated by reference.

Figure 1:
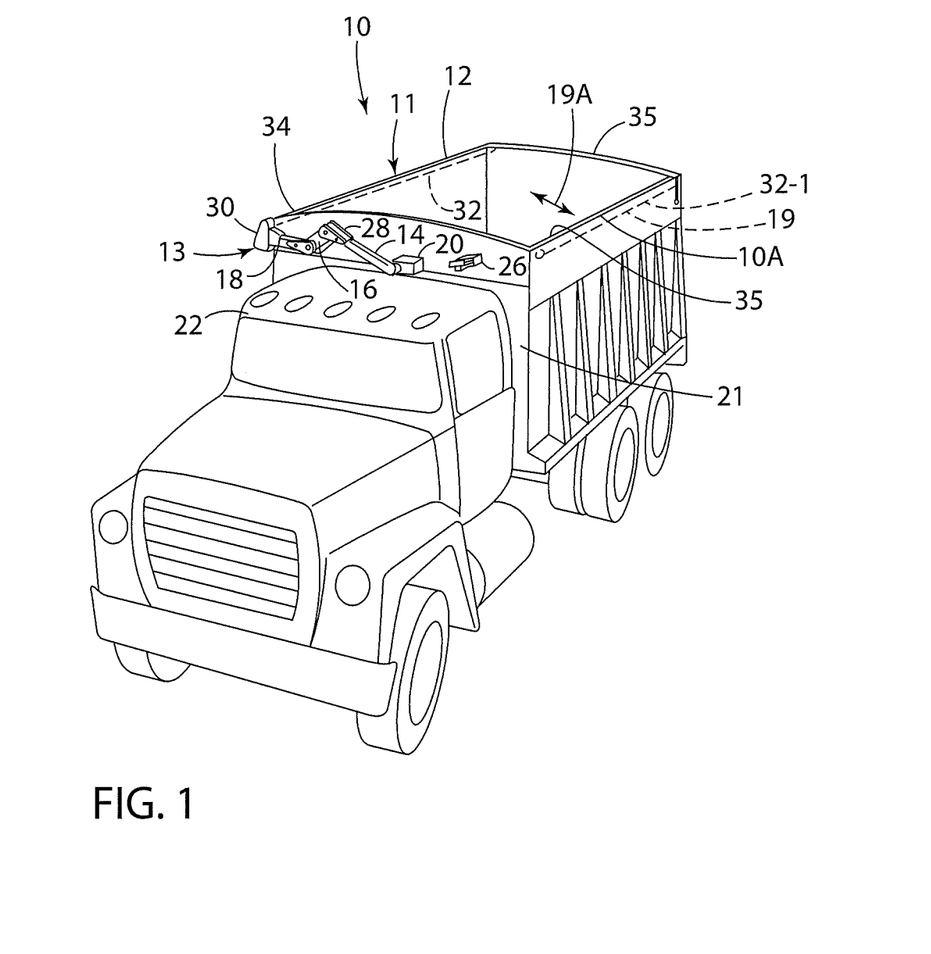
FIG. 1 is a perspective view illustrating a known prior art tarp rolling system on the bed of a vehicle, which is this example is a truck bed.

Side-to-side systems also exist that cover the vehicle bed from side to side. For instance, U.S. Pat. No. 5,328,228 shows a cover for truck bed and cargo. Similarly, U.S. Pat. No. 5,924,758 shows a roll assist mechanism for tarp systems. Further, U.S. Pat. Nos. 6,206,449 and 6,527,331, the disclosures of which are also hereby incorporated by reference, show a side-to-side truck cover system including a pair of arms, each of which includes a base and an extension. Further, a known side-to-side truck cover system is disclosed in U.S. Pat. No. 6,783,168, which is shown in FIG. 1 of this application, wherein the disclosure of the '168 is incorporated herein by reference in its entirety.

In known configurations, a tarp reel may be rolled across the vehicle bed to one bed wall and then back upwardly against a bracket on the bed wall to support the reel when the tarp is unrolled. Generally, a motor may work to continue to rotate the reel against the bracket, which increases tension on the tarp until the motor reaches a limit and stops. One current design limitation occurs as the reel or axle rolls up to and against the bracket wherein mechanical binding results from the reel hitting the bracket surfaces which frictionally binds and prevents any additional tension increase on the tarp. As mechanical binding increases, the motor stops.

It is an object to overcome disadvantages associated with mechanical binding in known tarp tension systems.

SUMMARY OF THE INVENTION

The present invention is an apparatus for covering a vehicle bed which incorporates an improved top rail design and bracket, which engage with the tarp reel and permit improved tensioning of the unrolled tarp. The top rail or bracket includes a pocket in which a tarp reel may be rotated by a motor when the tarp has been unrolled and fully covers the vehicle bed. As the tarp is completely unrolled, the reel continues to rotate which causes the reel to then climb upwardly into the pocket to a final translational or lockout position so that the reel is fully seated in the pocket.

In the improved design of the present invention, a roller configuration is provided in the pocket to eliminate mechanical binding due to frictional contact between the reel and pocket. In particular, the roller configuration preferably includes a lower roller, which is free to rotate in at least one direction, and an upper roller, which is free to rotate in at least one direction. Both rollers are rotatably supported by the bracket and project into the pocket for rolling contact with the reel and any tarp material thereon during tarp tensioning.

Generally, when the reel reaches the final lockout position, the motor continues to operate to rotate the reel in the pocket, which increases tension on the tarp until the motor reaches a limit and stops. Accordingly, during the covering operation, the reel reaches the final translational or lockout position while contacting the rollers. At this point, rotative force from the motor increases tarp tension by rotating the reel while the rollers reduce friction and mechanical binding.

As an additional improvement, such tensioning force can be increased if the upper top rail contacting the tarp has a low surface friction coefficient. This is achieved using a low friction adhesive material between the top rail and tarp.

In more detail, the rollers reduce mechanical friction, such that the reel is allowed to rotate and increase the tension in the tarp. The reel comes to rest when the motor power needed to further tension the tarp increases above a pre-set threshold and the tarp system controller that controls operation of the motor. Once this adjustable threshold is passed, the tarp system controller shuts off the motor, which may also include a holding device to prevent axle rotation of the reel. The roller configuration allows a greater amount of tarp tension.

If desired, a one-way clutch may be provided in one or both rollers which prevents the rollers from rotating in a second direction, which in turn prevents the reel from rolling out of the pocket and losing tension. However, upon command by the tarp system controller, the axle motor can be operated with enough power to turn the reel and overcome the braking effect of the rollers to intentionally move the reel out of the pocket to release tarp tension during uncovering of the vehicle bed.

In an alternate configuration, the pocket may still include a roller configuration while being formed with an arcuate surface that contacts the reel in the final translational or lockout position. When the reel finally does engage the top cap at the extreme end of its "climb" into the lockdown position or final translational position, the reel experiences a helpful static friction with the arcuate surface that aids the motor in holding tension in the tarp. The arc of the profile or arcuate surface has a diameter that matches the outer diameter of the reel, which provides a larger surface area that is contacting the reel as compared to if the profile was flat and there was just a point contact with the reel. In this manner, the rollers reduce friction until the reel contacts the arcuate surface which then imparts frictional contact therewith to help hold the tension.

The invention as disclosed herein provides improved tarp tensioning system which allows an increase in tarp tension without increasing the motor power. Other objects and purposes of the invention, and variations thereof, will be apparent upon reading the following specification and inspecting the accompanying drawings.

BRIEF DESCRIPTION OF THE DRAWINGS

The above-mentioned and other features of this disclosure and the manner of obtaining them will become more apparent, and the disclosure itself will be best understood by reference to the following descriptions of systems taken in conjunction with the accompanying figures, which are given as non-limiting examples only, in which.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to the figures, the invention relates to an improved vehicle bed covering system which includes a tarp tension roller system integrated into a vehicle top rail such as the top rail or edge of a vehicle bed such as a truck or trailer bed.

FIG. 1 shows a known truck or vehicle 10 with a prior art cover or tarp system with a roll-up tarp or cover assembly 11 having a rotatable reel 12 supported on an arm assembly 13 that governs movement of the reel 12 from one side of the vehicle 10 to the other side. The arm assembly 13 comprises a base segment 14, an intermediate segment 16 and an extension 18 which are pivotally connected together and articulate to move the reel 12 side-to-side across the vehicle bed 10A for rolling and unrolling a flexible tarp 19 to and from the reel 12. As indicated by reference arrow 19A, the tarp 19 can be pulled sideways, such as from the passenger side to the driver side of the vehicle 10 as indicated by arrow 19A to unroll the tarp 19 from the reel 12 and cover the vehicle bed or box 10A. Further, the tarp 19 can be pulled sideways in the reverse direction, such as from the driver side back to the passenger side, as also indicated by arrow 19A, to roll up the tarp 19 onto the reel 12 and uncover the vehicle bed or box 10A. This general type of side-to-side tarp system is known in the art. While the vehicle bed 10A is shown as a truck bed in this configuration, the vehicle bed 10A may be any vehicle bed for transporting loads such as a trailer bed.

To cover and uncover the vehicle bed 10A, the tarp assembly 11 includes the rotatable reel 12 rotatably supported on the arm assembly 13 wherein the tarp 19 is fully wound onto the reel 12 when in the uncovered position. In turn, the tarp 19 can be unrolled from the reel 12 to cover the vehicle bed 10A as described further below. While the tarp assembly 11 and reel 12 are positioned on the passenger side of the vehicle 10 when in the uncovered position as shown, the skilled artisan will understand that the tarp system can be reversed wherein the tarp assembly 11 can be mounted on the opposite, driver side of the vehicle. The present invention is not limited to the particular position of the tarp assembly 11 on one side of the vehicle or the other. Similarly, the present disclosure describes the vehicle as being a truck with the vehicle bed 10A mounted to the chassis, but the disclosure is not so limited to this configuration. The skilled artisan will appreciate that the vehicle may be a trailer having a box-like trailer bed to which the tarp assembly 11 is mounted on either the passenger side or driver side as defined relative to the truck or other vehicle hauling the trailer.

With respect to the arm assembly 13, the base 14 is mounted to the truck 10 by a base plate 20 preferably mounted to a front wall 21 of the vehicle bed 10A proximate a top of a cab 22 of the truck 10. The arm assembly 13 includes a motor 30 mounted on the distal end of the extension 18. One fixed end of the tarp 19 can be releasably fixed at one or more points along a line below the top bed edge 34 of one side of the vehicle bed 10A proximate the reel 12, wherein the other free end 32 of the tarp 19 is fixed to the reel 12 so as to roll onto and off of the reel 12. The rotatable reel 12 is rotatably supported by the extension 18 and rotatably driven by the motor 30, so as to function as a take-up spool for rolling and unrolling the tarp 19 during uncovering and covering of the vehicle bed 10A. To cover the vehicle bed 10A, the reel 12 can be displaced by the arm assembly 13 from an uncovered position adjacent the top bed edge 34 toward the other top bed edge 35. As the reel 12 travels between the bed edges 34 and 35, the tarp edge 32 moves with the interconnected reel 12 to cover the vehicle bed 10A. For illustrative purposes, FIG. 1 shows the tarp edge 32 in an intermediate position part ways between the top bed edges 34 and 35 as indicated by reference arrow 32-1, wherein the vehicle bed 10A is partially covered by the tarp 19.

To displace the reel 12 from one vehicle side to the other, the arm assembly 13 has the base segment 14, intermediate segment 16 and the extension 18 pivotally joined together in a known manner so that the arm assembly 13 swings or pivots about the base plate 20 to displace the reel 12 from one side of the vehicle to the other. In this regard, the motor 30 on extension 18 may be powered, from within or out of the cab of the truck 10, to facilitate this operation. This is one example of a side-to-side tarp system compatible with the present enhancements.

Figure 2:
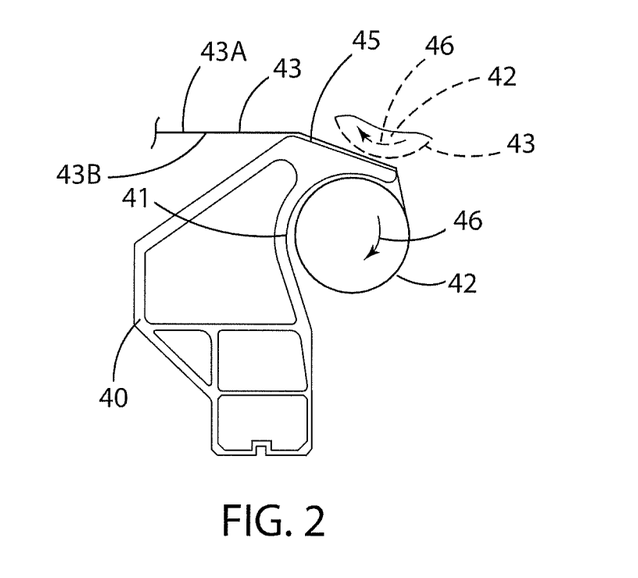
FIG. 2 is an end view illustrating a first embodiment of a bracket and tarp reel secured in a pocket thereof.
Figure 3:
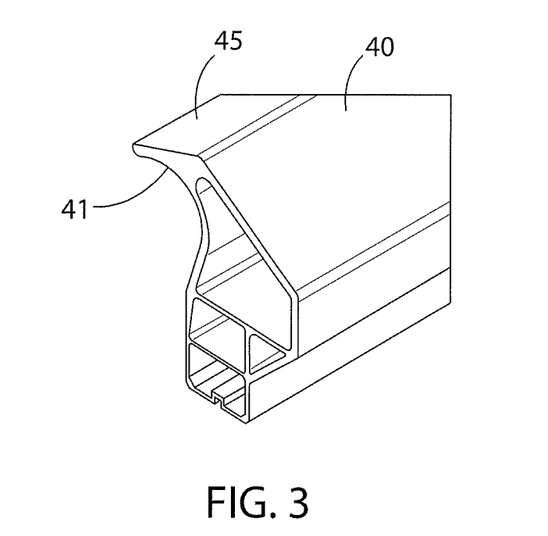
FIG. 3 is a perspective view of the bracket.

The cover system 11 may also be modified as described below. With respect to FIGS. 2 and 3, FIGS. 2 and 3 illustrate a top rail bracket or fixture 40, wherein one or more of such brackets 40 may be fixed to the vehicle bed 10A of FIG. 1 near the top bed edge 35 to engage with the reel 12 after unrolling of the tarp 19. The top bed edge 35 may be formed by a top rail of the vehicle bed 10A or other bed structure to which the brackets 40 are mounted.

In this configuration, the bracket 40 forms an arcuate pocket 41 that opens downwardly and outwardly to seat a tarp reel 42 therein. The tarp reel 42 is structurally and functionally similar to the tarp reel 12 described above, wherein the reel 42 supports a tarp 43 which is rolled and unrolled by an arm assembly like arm assembly 13 above. In the position shown in FIG. 2, the tarp 43 covers the vehicle bed and the reel 42 tensions the tarp 43 in this unrolled position. The bracket 40 also includes an inclined edge surface 45 which is covered by the unrolled tarp 43.

During unrolling, the motor 30 would effectively rotate the reel 42 in the clockwise direction shown by arrow 46. FIG. 2 diagrammatically illustrates the reel 42 in phantom outline in an intermediate position, wherein the reel 42 is above the outer surface 43A of the tarp 43 as the reel 42 rotates clockwise 46 to unroll the tarp 43. In this position, the reel 42 rolls across inclined edge surface 45.

As the reel 42 rolls downwardly past the inclined edge surface 45, the reel 42 then hangs downwardly from the bracket 40 and continues to rotate clockwise. As the tarp 43 is completely unrolled a short distance below the bracket 40, the reel 42 continues to rotate clockwise which causes the reel 42 to then roll up the inside tarp surface 43B and climb upwardly toward the pocket 41 to a final translational position in which the reel 42 is seated in the pocket 41 as seen in solid outline in FIG. 2.

The motor 30 works to continue to rotate the reel 42 clockwise in the pocket 41, which increases tension on the tarp 43, until the motor 30 reaches a limit and stops. One current design limitation occurs as the reel or axle 42 rolls into pocket 41 wherein mechanical binding results from the reel 42 hitting the inside pocket surfaces or walls which frictionally binds and prevents any additional tension increase on the tarp 43 as the motor 30 attempts to drive the axle of the reel 42. As mechanical binding increases, the motor 30 stops. As such, additional tarp tension is limited after the reel 42 hits the stop defined by the pocket 41. In this design, to increase tension, it is required that the tarp reel 42 reach the final translational position (e.g. center of reel axle is no longer moving upwardly) and then continue to rotate the reel 42 to increase tension in the tarp 43. As noted, this is impeded by the increased friction and binding between the outer surface of the reel 42 and any tarp 43 thereon and the opposing inner surface of the pocket 41.

Figure 4:
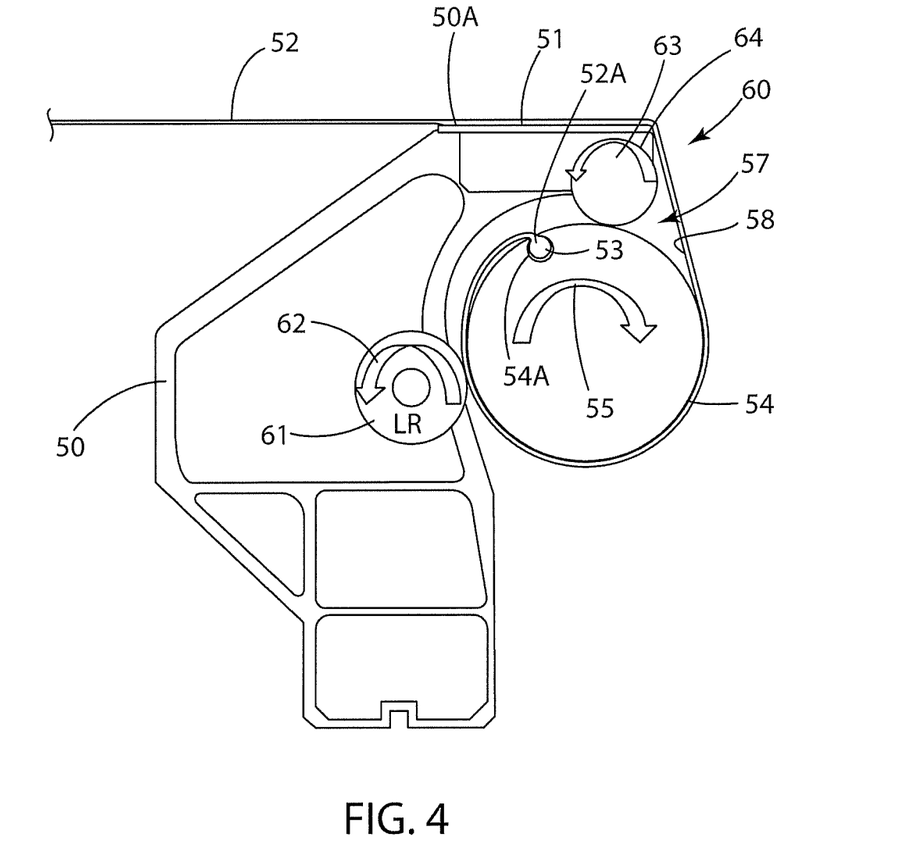
FIG. 4 is an end view of an improved embodiment of a bracket and reel according to the present invention.

To overcome disadvantages associated with the design of FIGS. 2 and 3, FIG. 4 illustrates an improved top rail design and bracket 50 therefor. The top rail or bracket 50 is shown in profile view and preferably is formed as an aluminum extrusion. The bracket 50 includes a top surface 50A which preferably includes an adhesive tape or substrate 51 having a low surface friction which facilitates sliding of the tarp 52 over the surface thereof, particularly during tensioning or stretching of the tarp 52.

As shown, the tarp 52 has an end edge 53 secured to the outer diameter of the reel 54 so that the tarp 52 is rolled onto or unrolled from the reel 54 by reversible rotation of the reel 54. Preferably, tarp attachment is accomplished with a key 52A formed in the end edge 53 and a groove 54A formed in the reel 54.

In a manner similar to that described above, the reel 54 may be rotated by a motor 30 in a clockwise direction indicated by reference arrow 55 to unroll the tarp 52. Clockwise rotation of the reel 54 allows the reel 54 to move downwardly past the top surface 51 such that the reel 54 then hangs downwardly from the bracket 50 and continues to rotate clockwise. The reel 54 now hangs below an arcuate pocket 57 formed in the bracket 50. As the tarp 52 is completely unrolled, the reel 54 continues to rotate clockwise which causes the reel 54 to then roll up the inside tarp surface 58 and climb upwardly toward and into the pocket 57 to a final translational position shown so that the reel 54 is fully seated in the pocket 57 as seen in solid outline in FIG. 4.

In the design of FIG. 3, mechanical binding was a problem. In the improved design of FIG. 4, a roller configuration 60 is provided in the pocket 57 to eliminate mechanical binding due to frictional contact between the reel 54 and pocket 57. In particular, the roller configuration 60 includes a lower roller 61, which is free to rotate counterclockwise as indicated by arrow 62, and an upper roller 63, which is free to rotate counterclockwise as indicated by arrow 64. Both rollers are rotatably supported by the bracket 50, and project into the pocket 57 for rolling contact with the reel 54 and any tarp material thereon, which prevents the reel 54 from frictionally binding with the pocket surface. The rollers 61 and 63 are vertically spaced apart and horizontally offset or spaced apart, to form a space extending at an angle between the rollers 61 and 63.

As an additional advantage, each roller 61 and 63 may include a one-way clutch, which prevents clockwise rotation each of the rollers 61 and 63. As such, the clutches prevent the reel 54 from rotating counter-clockwise when the rollers 61 and 63 contact the reel 54 and tarp 52 thereon, which helps lock rotation of the reel 54 in the final translational position to maintain tension on the tarp 52.

Generally, when the reel 54 reaches the final position of FIG. 4, the motor 30 continues to operate to rotate the reel 54 clockwise in the pocket 57, which increases tension on the tarp 52, until the motor 30 reaches a limit and stops. Accordingly, during the covering operation, the reel 54 reaches the final translational position while contacting the rollers 61 and 63 in the top rail pocket 57. Rotative force from the axle motor 30 increases tarp tension by rotating the reel 54 in the clockwise direction. Such force can be maximized if the upper top rail 50 contacting the tarp 52 has a low surface friction coefficient. This is achieved using the low friction adhesive material 51 between the top rail 50 and tarp 52.

Further, the rollers 61 and 63 reduce mechanical friction, such that the reel 54 is allowed to rotate further in the clockwise direction increasing tension in the tarp 52. The reel 54 comes to rest when the motor power needed to further tension the tarp 52 increases above a pre-set threshold in the tarp system controller that controls operation of the motor 30. Once this adjustable threshold is passed, the tarp system controller shuts off the motor 30, which may also include a holding device to prevent axle rotation of the reel 54.

As noted above, the one-way clutches in the upper roller 61 and lower roller 63 prevent the rollers 61 and 63 from rotating in the clockwise direction, which in turn prevents the reel 54 from rotating counter-clockwise. As such, the reel 54 is locked in the final translation position of FIG. 4 by the rollers 61 and 63 and by the lockout of the motor 30. With this system, the tension of the tarp 52 can also be increased.

Upon command by the tarp system controller, the axle motor 30 operates with enough power to turn the reel 54 counter-clockwise and slip past or overcome the braking effect of the rollers 61 and 63 to pull the tarp out of the top rail bracket 50 during the uncovering operation wherein the reel 54 can then rotate counterclockwise and move downwardly. At the lowest point of travel, the reel 54 continues to rotate counterclockwise and wind up or roll the tarp 52 as the reel 54 travels back to the opposite side of the vehicle bed 10A. Specific details of the rolling and unrolling operation have been described above relative to FIG. 1 and it is understood the tarp system may be modified to incorporate the features of FIG. 4 in accord with the present invention.

Figure 5:
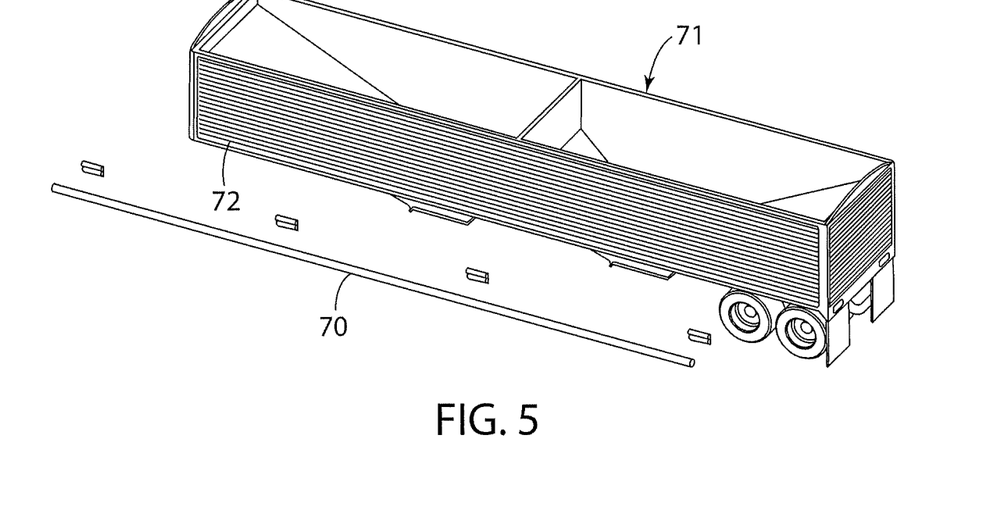
FIG. 5 is a side perspective view of a further embodiment of the invention illustrating a tarp reel and brackets mountable on a vehicle bed, which in this configuration is a trailer bed.
Figure 6:
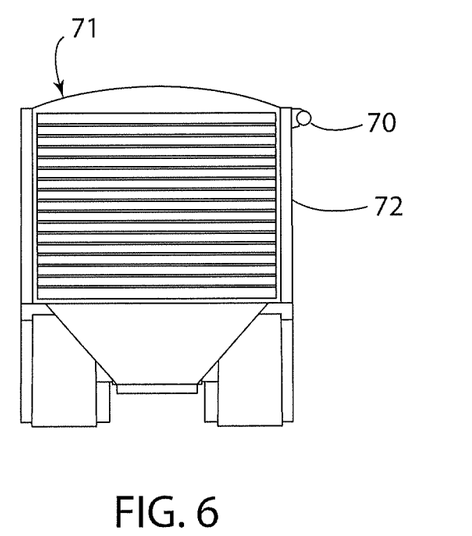
FIG. 6 is an end view of the vehicle bed with a bracket assembly of the present invention.

Next, FIGS. 5-12 illustrate a modified embodiment of FIG. 4. The following disclosure primarily addresses the differences with the prior embodiment of the present invention. Referring to FIGS. 5 and 6, this embodiment includes a tarp reel 70 which may be mounted to a vehicle bed such as the trailer bed 71 shown in FIGS. 5-7. The tarp reel 70 may be supported on and driven by a motor 30 and arm assembly 13 in accord with the above description, wherein such parts have been omitted for expediency. It will be understood that other tarp systems are known and commercially available and they may be modified and upgraded in accord with the following disclosure.

As to such known systems, "locking lips" or fixed flanges are currently utilized in the industry and form fixed entities mounted to the wall of a vehicle bed that could engage with the reel 70 in a manner similar to that described above relative to FIG. 3. These fixed prior art brackets provide no means to reduce the realized friction that the tarp reel 70 would encounter as it rotates into the lock down position or the final translational position described above. In this position, the reel 70 would be experiencing resistive force from high levels of sliding friction generated between the contact of the rotating reel or axle 70 with the rigid trailer side wall 72 and the rigid underside of the locking lip. This resistive force or mechanical binding lessens the amount of motor torque applied to actually stretch the tarp tight and creates the disadvantages described above.

Figure 7:
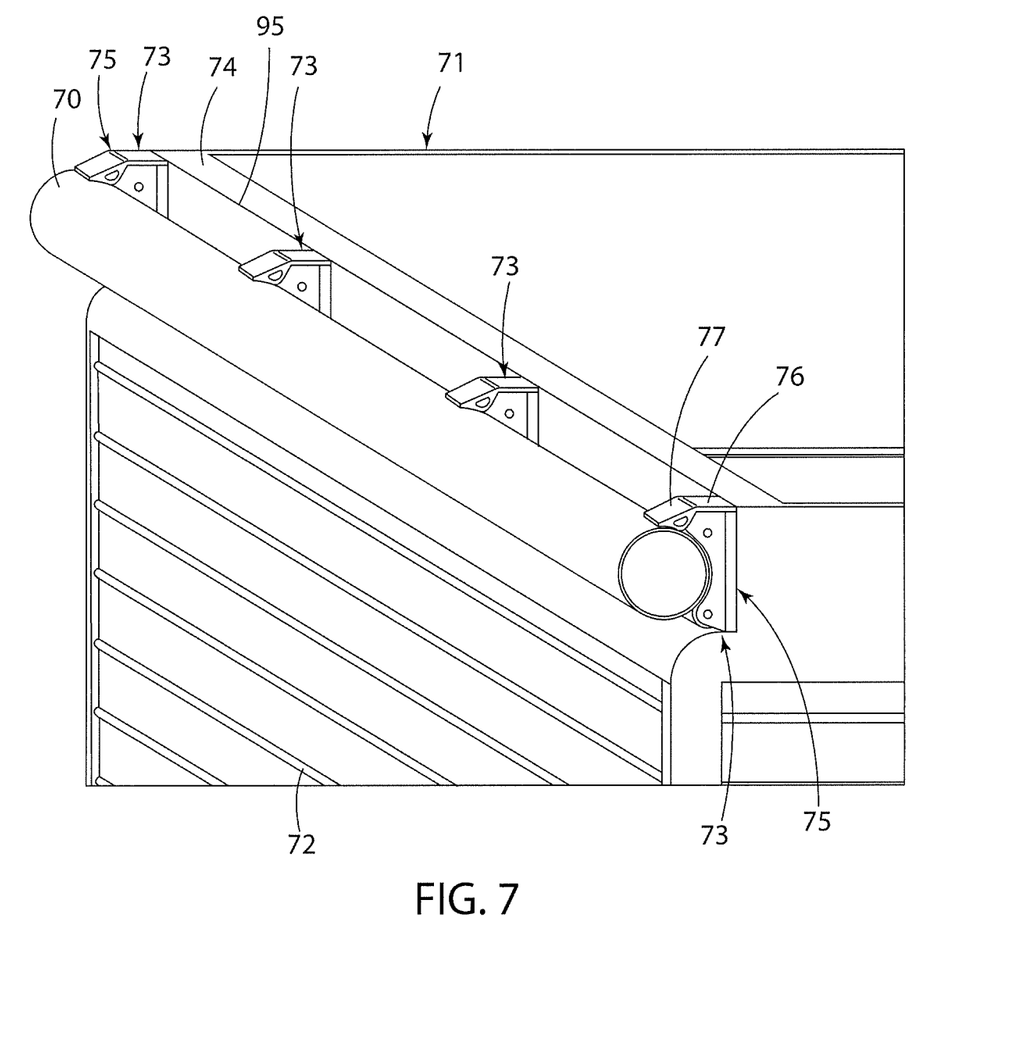
FIG. 7 is an enlarged, fragmentary perspective of the vehicle bed.

With respect to the second embodiment of the present invention as shown in FIGS. 5-7, at least one tarp tensioning lock down assembly 73 is provided and preferably multiple assemblies 73 are mounted at spaced apart locations along the top rail or top edge 74 of the bed wall 72. Generally, each assembly 73 defines a bracket unit 75 that functions similar to the bracket 50 of FIG. 4.

Figure 8:
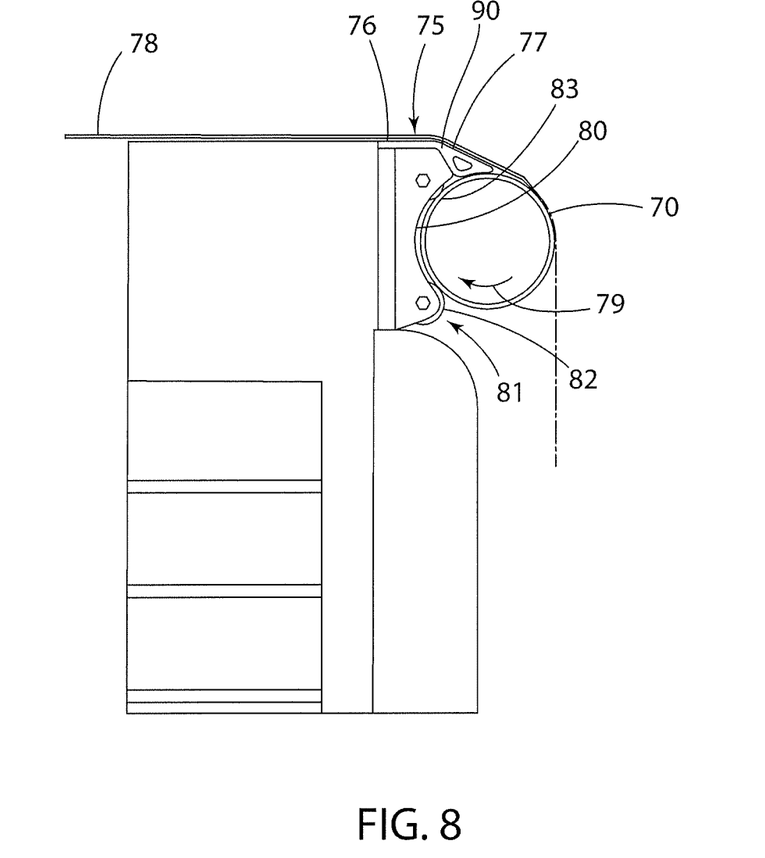
FIG. 8 is an enlarged, fragmentary end view of the vehicle bed.

Referring to FIG. 8, the bracket unit 75 includes a top surface 76 and an inclined edge surface 77, wherein the tarp 78 rests upon and slides over such surfaces 76 and 77 during tarp tensioning. As shown, the tarp 78 has an end edge secured to the outer diameter of the reel 70 so that the tarp 78 is rolled up or unrolled by reversible rotation of the reel 70.

Similar to the above description, the reel 70 may be rotated by a motor 30 in a clockwise direction indicated by reference arrow 79 to unroll the tarp 78. In the same manner as described above, clockwise rotation of the reel 70 allows the reel 70 to move downwardly past the bracket unit 75 such that the reel 70 then hangs downwardly from the bracket 75 and continues to rotate clockwise. As the tarp 76 is completely unrolled, the reel 70 continues to rotate clockwise which causes the reel 70 to then climb upwardly toward and travel into a pocket 80 to a final translational position shown in FIG. 8.

In the improved design of FIG. 8, a roller configuration 81 is provided in the pocket 80 to eliminate mechanical binding due to frictional contact between the reel 70 and pocket 80. In particular, the roller configuration 81 includes a lower roller 82, which is free to rotate, and an upper roller 83, which also is free to rotate. Both rollers 82 and 83 are rotatable and vertically spaced apart, and project into the pocket 80 for rolling contact with the reel 70. In this embodiment, the rollers 81 and 82 are in substantial vertical alignment.

As an additional advantage, each roller 82 and 83 might include a one-way clutch, which may prevent clockwise rotation of the rollers 82 and 83 although this embodiment omits such clutching to preferably allow free rotation of the rollers 82 and 83.

Figure 9:
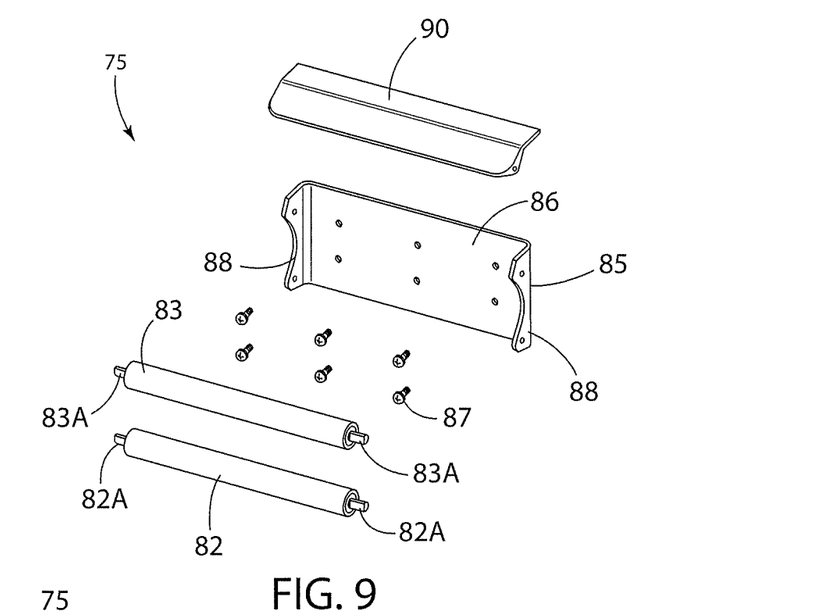
FIG. 9 is an exploded view of the bracket assembly.
Figure 10:
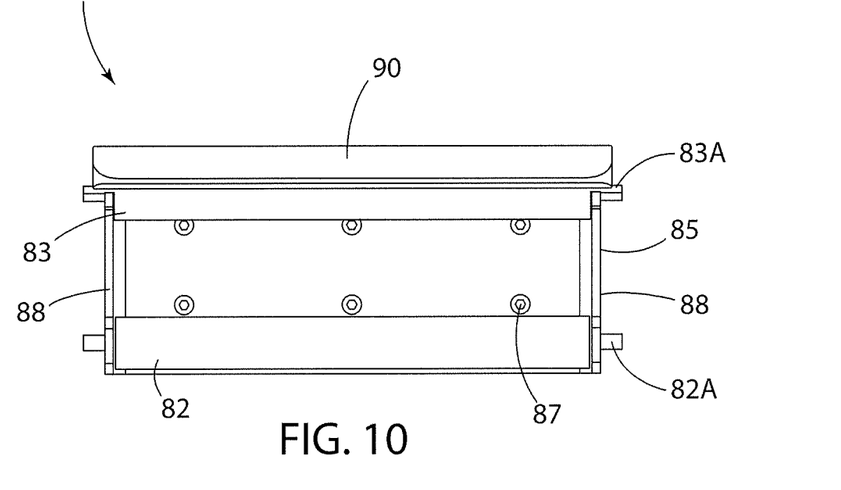
FIG. 10 is a side view thereof.

More particularly as to the bracket construction shown in FIGS. 9 and 10, the bracket unit 75 comprises a main mounting bracket 85, which rotatably supports the rollers 82 and 83 by pivot shafts 82A and 83A. The pivot shafts 82A and 83A define respective rotation axes that are substantially parallel to each other to provide uniform roller contact with the reel 70. The bracket 85 mounts to the bed wall 72 to define the mounting location for the rollers 82 and 83 and the mounting location of the bracket unit 75 relative to the top rail of the vehicle bed. The bracket 85 includes thru holes 86 for the trailer wall fasteners 87 that secure the bracket 85 in place on the bed wall 72.

As noted, the rollers 82 and 83 are rotatably supported by side flanges 88 in parallel relation. The rollers 82 and 83 preferably are formed as roller bearings, and are vertically spaced far enough apart to not allow the reel 70 to pass horizontally between them during tarp tensioning. The rollers 82 and 83 provide the contact points with the roller 70 and define a space therebetween into which the reel 70 locks during the bed covering operation.

Figure 11:
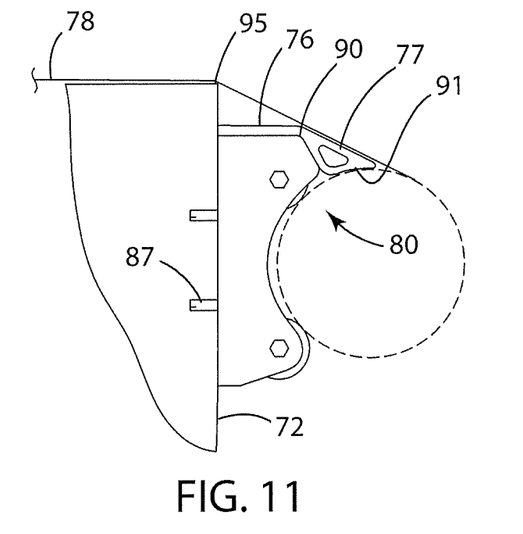
FIG. 11 is a diagrammatic end view of the bracket assembly mounted to the vehicle bed.
Figure 12:
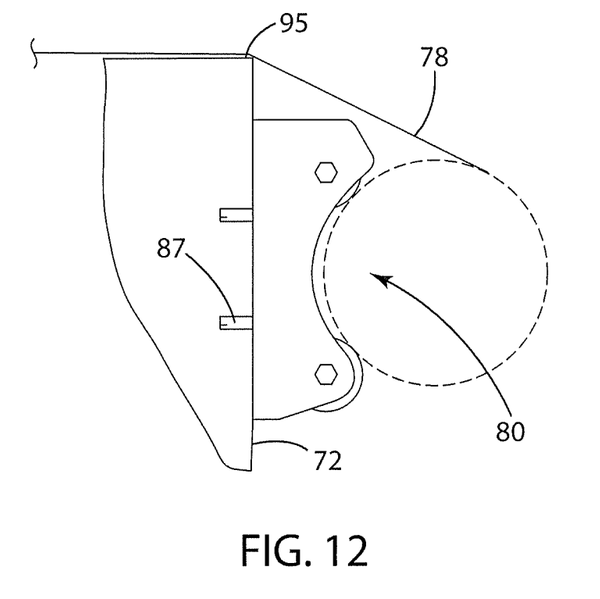
FIG. 12 is an end view corresponding to FIG. 11 with a top plate omitted for illustrative purposes.

Additionally, the bracket 85 includes an extruded top cap 90 that defines the top surface 76 and inclined edge surface 77 described above. Preferably, the top cap 90 is form as an aluminum extrusion that is cut to length. The sides will be rounded and sharp edges will be blunted to not cause damage to the tarp 78 rolling over it and then being tensioned. The top cap 90 preferably is fastened or welded to the top of the bracket 85. Its specific geometry and location ensure the reel 70 does not come into contact with it until the last moment after applying the majority of the torque for tarp tensioning as seen in FIG. 11.

When the reel 70 finally does engage the top cap 90 at the extreme end of its "climb" into the lockdown position or final translational position, the reel 70 experiences a helpful static friction with the arcuate surface 91 that aids the system motor 30 which preferably has an electric brake and shunt to resist any opposing forces, such as pressure differentials, shock and vibrations during vehicle travel. The arcuate surface 91 (FIG. 11) of the top cap 90 has a profile that assists the static resistance at the end of the lock down cycle, which generates a braking effect on the reel 70 to assist the motor 30 in maintaining the tarp 78 in tension. The arc of the profile or arcuate surface 91 has a diameter that matches the outer diameter of the reel 70 to generate contact over a partial circumference of said reel 70. This circumferential or arcuate contact provides a larger surface area that is contacting the reel 70 as compared to if the profile was flat and there was just a point contact with the reel 70.

To determine the position of the top cap 90, the location is determined by the tarp 78 itself. At some point, the tarp 78 will not stretch anymore and all the resistive forces will finally exceed the controllers amp threshold requirement and the motor 30 will be turned off. If the tarp material at some point will stop stretching and does not break, then there will be a point where the reel 70 will no longer be able to "climb" within the pocket 80. The reel 80 simply will not be able to turn a degree more since the motor 30 has reached its cutoff threshold, and therefore the reel 70 will not rise any further. This point can be determined by the tangent line extending between the reel 70 and the top corner 95 of the vehicle wall 72, wherein this tangent line is generally parallel to the inclined surface 77. In the alternative, the top surface 76 might also be at the same elevation as the top corner 95 as seen in FIG. 7.

In this configuration, the rollers 82 and 83 may be formed as roller bearings and the bracket profile essentially reduces the realized friction typically seen with fixed entities. The two locations of sliding friction found in the prior art are replaced with two locations of rolling friction as defined by the contact lines on the rollers 82 and 83. Rolling friction is significantly less than sliding friction and thus greater levels of motor output torque can be incorporated into stretching the tarp 78 tighter before the controller shuts the motor 30 off at the specified amp threshold. At this point of the covering operation, the vehicle bed is covered and the tarp 78 held taut.

Although particular preferred embodiments of the invention have been disclosed in detail for illustrative purposes, it will be recognized that variations or modifications of the disclosed apparatus, including the rearrangement of parts, lie within the scope of the present invention.

We claim:

1. A covering system for extending and retracting a tarp over a vehicle bed of a vehicle, the covering system comprising:
    a movable reel operatively supported on the vehicle bed by an arm assembly movable to displace said reel from a first side of said vehicle bed to a second side of said vehicle bed;
    a tarp connected to said vehicle bed and said reel, wherein said tarp is rollable onto said reel and unrollable from said reel during displacement of said reel from said first side to said second side to cover said vehicle bed;
    a motor mounted on said arm assembly and drivingly engaged with said reel to selectively roll and unroll said tarp over said vehicle bed;
    at least one tarp support bracket mounted on said second side of said vehicle bed having a pocket for receiving said reel therein while permitting rotation of said reel by said motor, said bracket including a roller configuration which rollingly contacts said reel to facilitate tensioning of said tarp during rotation of said reel in said pocket by said motor;
    wherein said reel is displaced into said pocket to a lockout position by rotation of said reel and rolling of a portion of said tarp onto said reel; and
    wherein said bracket includes an arcuate pocket surface which contacts said reel when displaced to said lockout position to resist reel rotation, which turns off said motor, wherein said arcuate pocket surface is in frictional contact with said reel to resist rolling displacement of said reel away from said lockout position.

2. The covering system according to claim 1, wherein said roller configuration comprises first and second rollers disposed in spaced relation to rollingly support said reel in said pocket.

3. The covering system according to claim 2, wherein said first and second rollers are vertically spaced apart within said pocket.

4. The covering system according to claim 3, wherein said first and second rollers are horizontally spaced apart within said pocket.

5. The covering system according to claim 2, wherein said roller configuration provides rolling contact between said reel and said bracket to reduce mechanical binding of said reel.

6. The covering system according to claim 5, wherein said bracket provides braking of said reel when said reel when displaced to said lockout position to resist reverse rotation of said reel and resist rolling displacement of said reel away from said lockout position.

7. The covering system according to claim 6, wherein braking of said reel when said reel is displaced to said lockout position is provided by clutches in said roller configuration to resist said reverse rotation of said reel and resist said rolling displacement of said reel away from said lockout position.

8. The covering system according to claim 6, wherein braking of said reel when said reel is displaced to said lockout position is provided by frictional contact between said bracket and said reel to resist said reverse rotation of said reel and resist said rolling displacement of said reel away from said lockout position.

9. A bracket unit for a covering system configured for extending and retracting a tarp over a vehicle bed of a vehicle, wherein said covering system includes a motor-driven reel operatively supported on the vehicle bed by an arm assembly to displace said reel from a first side of said vehicle bed to a second side of said vehicle bed, said bracket unit comprising:
    at least one bracket body mountable to said second side of said vehicle bed for engagement with said reel carrying tarp, wherein said tarp is rollable onto said reel and unrollable from said reel to uncover and cover said vehicle bed;
    said bracket body including a pocket which opens downwardly and sidewardly to receive said reel therein, said bracket body having a top surface over which said tarp and said reel may hang during unrolling; and
    said bracket body including a roller configuration which projects into said pocket for rolling contact with said reel to facilitate tensioning of said tarp during motor-driven rotation of said reel in said pocket;
    wherein said reel is displaced into said pocket to a lockout position by rotation of said reel and rolling of a portion of said tarp onto said reel; and
    wherein said bracket unit includes an arcuate pocket surface which contacts said reel when displaced to said lockout position to resist reel rotation, wherein said arcuate pocket surface is in frictional contact with said reel to resist rolling displacement of said reel away from said lockout position.

10. The bracket unit according to claim 9, wherein said roller configuration comprises first and second rollers disposed in spaced relation to rollingly support said reel in said pocket.

11. The bracket unit according to claim 10, wherein said first and second rollers are vertically spaced apart within said pocket.

12. The bracket unit according to claim 11, wherein said first and second rollers are horizontally spaced apart within said pocket.

13. The bracket unit according to claim 9, wherein said roller configuration provides rolling contact between said reel and said bracket to reduce mechanical binding of said reel.

14. The bracket unit according to claim 9, wherein said bracket unit provides braking of said reel when said reel when displaced to said lockout position to resist reverse rotation of said reel and resist rolling displacement of said reel away from said lockout position.

15. The bracket unit according to claim 14, wherein braking of said reel when said reel is displaced to said lockout position is provided by clutches in said roller configuration to resist said reverse rotation of said reel and resist said rolling displacement of said reel away from said lockout position.

16. The bracket unit according to claim 14, wherein braking of said reel when said reel is displaced to said lockout position is provided by frictional contact between said bracket and said reel to resist said reverse rotation of said reel and resist said rolling displacement of said reel away from said lockout position.

17. The bracket unit according to claim 9, wherein said arcuate pocket surface having an arc profile formed with a diameter proximate an outer diameter of said reel to effect contact over a partial circumference of said reel.

\* \* \* \* \*